United States Patent
Mølgaard et al.

(10) Patent No.: US 12,234,756 B2
(45) Date of Patent: Feb. 25, 2025

(54) EXHAUST GAS CLEANING SYSTEM AND METHOD FOR CLEANING EXHAUST GAS AND USE OF EXHAUST GAS CLEANING SYSTEM

(71) Applicant: ALFA LAVAL CORPORATE AB, Lund (SE)

(72) Inventors: Søren Mølgaard, Støvring (DK); Nick Høy Hansen, Aalborg (DK); Ruddi Kruse Mortensen, Nibe (DK)

(73) Assignee: ALFA LAVAL CORPORATE AB, Lund (SE)

( * ) Notice: Subject to any disclaimer, the term of this patent is extended or adjusted under 35 U.S.C. 154(b) by 0 days.

(21) Appl. No.: 17/740,860

(22) Filed: May 10, 2022

(65) Prior Publication Data
US 2022/0364487 A1 Nov. 17, 2022

(30) Foreign Application Priority Data
May 12, 2021 (EP) .................................... 21173594

(51) Int. Cl.
*F01N 3/02* (2006.01)
*F01N 3/022* (2006.01)
(Continued)

(52) U.S. Cl.
CPC ........... *F01N 3/022* (2013.01); *F01N 3/0233* (2013.01); *F01N 3/029* (2013.01); *F01N 3/035* (2013.01);
(Continued)

(58) Field of Classification Search
CPC .... F01N 13/004; F01N 13/0097; F01N 13/02; F01N 2240/20; F01N 2250/02;
(Continued)

(56) References Cited

U.S. PATENT DOCUMENTS

| | | | |
|---|---|---|---|
| 4,276,071 A | 6/1981 | Outland | |
| 4,627,406 A * | 12/1986 | Namiki | F01M 13/04 123/573 |

(Continued)

FOREIGN PATENT DOCUMENTS

| | | |
|---|---|---|
| CN | 202179914 U | 4/2012 |
| CN | 102463015 A | 5/2012 |

(Continued)

OTHER PUBLICATIONS

English translation of the Office Action (First Office Action) issued Apr. 27, 2023, by the National Intellectual Property Administration, P. R. China in corresponding Chinese Patent Application No. 202210503347.2. (10 pages).

(Continued)

*Primary Examiner* — Phutthiwat Wongwian
*Assistant Examiner* — Diem T Tran
(74) *Attorney, Agent, or Firm* — BUCHANAN INGERSOLL & ROONEY PC

(57) ABSTRACT

An exhaust gas cleaning system includes a particle filter device comprising a casing, plural hollow ceramic filter rods arranged at least partly inside a gas passage of the casing, and a gas inlet and gas outlet. The particle filter device guides exhaust gas from the gas inlet, through the gas passage and to the gas outlet. The particle filter device further comprises a perforated plate extending at least partly along the filter rods and partly blocking an exhaust gas flow path from the gas inlet to the gas passage. The perforated plate defines openings allowing exhaust gas to flow into the gas passage. The filter rods are gas permeable to allow exhaust gas to penetrate, during filtration, a respective wall of the filter rods and flow into the filter rods. A respective open upper end of the filter rods communicates with the gas outlet so exhaust gas leaves the casing.

20 Claims, 5 Drawing Sheets

(51) Int. Cl.
*F01N 3/023* (2006.01)
*F01N 3/029* (2006.01)
*F01N 3/035* (2006.01)

(52) U.S. Cl.
CPC ...... *F01N 2250/02* (2013.01); *F01N 2330/06* (2013.01); *F01N 2590/02* (2013.01)

(58) Field of Classification Search
CPC ............ F01N 2260/04; F01N 2330/06; F01N 2590/00; F01N 2590/02; F01N 3/021; F01N 3/0211; F01N 3/0212; F01N 3/022; F01N 3/0233; F01N 3/029; F01N 3/035; F01N 3/2892; Y02A 50/20
See application file for complete search history.

(56) References Cited

U.S. PATENT DOCUMENTS

| | | | |
|---|---|---|---|
| 5,042,249 | A * | 8/1991 | Erdmannsdoerfer ........................ F01N 3/0212 60/299 |
| 5,497,620 | A | 3/1996 | Stobbe |
| 5,853,438 | A | 12/1998 | Igarashi |
| 6,488,269 | B1 | 12/2002 | Chuang et al. |
| 6,989,045 | B2 | 1/2006 | Bailey et al. |
| 7,273,514 | B2 | 9/2007 | Bailey et al. |
| 10,060,313 | B2 | 8/2018 | Archetti |
| 10,286,360 | B2 | 5/2019 | Johansen et al. |
| 2003/0185722 | A1 * | 10/2003 | Toyoda .............. B01D 53/9454 422/177 |
| 2004/0261374 | A1 | 12/2004 | Bailey et al. |
| 2008/0314248 | A1 | 12/2008 | Peteln |
| 2009/0269265 | A1 | 10/2009 | Ando et al. |
| 2014/0050626 | A1 | 2/2014 | Heidenreich |
| 2017/0370262 | A1 * | 12/2017 | Zoran .................. F01N 13/009 |

FOREIGN PATENT DOCUMENTS

| | | |
|---|---|---|
| CN | 103170191 A | 6/2013 |
| CN | 203108345 U | 8/2013 |
| CN | 204121934 U | 1/2015 |
| CN | 104289066 B | 6/2016 |
| CN | 106268097 A | 1/2017 |
| CN | 206081976 U | 4/2017 |
| CN | 105149092 B | 8/2017 |
| CN | 107335296 A | 11/2017 |
| CN | 206980341 U | 2/2018 |
| CN | 207412968 U | 5/2018 |
| CN | 207680377 U | 8/2018 |
| CN | 207871778 U | 9/2018 |
| CN | 109758855 A | 5/2019 |
| CN | 209752582 U | 12/2019 |
| CN | 209952488 U | 1/2020 |
| CN | 110913974 A | 3/2020 |
| CN | 211008825 U | 7/2020 |
| DE | 3815148 A1 | 11/1989 |
| DE | 42 29 723 C1 | 9/1993 |
| EP | 0395840 A1 | 11/1990 |
| EP | 0507116 A2 | 10/1992 |
| EP | 2146062 A1 | 1/2010 |
| EP | 3194736 A1 | 7/2017 |
| EP | 3194737 B1 | 6/2020 |
| GB | 312 294 A | 5/1929 |
| JP | H11-081986 A | 3/1999 |
| JP | 2002-219330 A | 8/2002 |
| JP | 2004-340049 * | 12/2004 |
| JP | 3597713 B2 | 12/2004 |
| JP | 3597722 B2 | 12/2004 |
| JP | 2005230677 A | 9/2005 |
| JP | 2005230678 A | 9/2005 |
| JP | 2009-262098 A | 11/2009 |
| JP | 2012-115793 A | 6/2012 |
| JP | 2019-171346 A | 10/2019 |
| KR | 20120060731 * | 6/2012 |
| KR | 1020120060731 A | 6/2012 |
| KR | 102240510 B1 | 4/2021 |
| TW | M484457 U | 8/2014 |
| TW | M571704 U | 12/2018 |
| TW | M571943 U | 12/2018 |
| WO | 9506510 A1 | 3/1995 |
| WO | 2014169967 A1 | 10/2014 |
| WO | 2016029926 A1 | 3/2016 |
| WO | 2019/025073 A1 | 2/2019 |

OTHER PUBLICATIONS

Office Action (Notice of Reasons for Rejection) issued May 29, 2023, by the Japan Patent Office in corresponding Japanese Patent Application No. 2022-077012 and an English translation of the Office Action. (8 pages).

Office Action (Notice of Preliminary Rejection) issued on Jan. 15, 2024, in corresponding Korean Patent Application No. 10-2022-0057336 and English translation of the Office Action. (10 pages).

* cited by examiner

EXHAUST GAS CLEANING SYSTEM AND METHOD FOR CLEANING EXHAUST GAS AND USE OF EXHAUST GAS CLEANING SYSTEM

TECHNICAL FIELD

The invention relates to an exhaust gas cleaning system for cleaning exhaust gas, e.g. from a marine engine, burner or boiler. The invention also relates to a method for cleaning exhaust gas, e.g. from a marine engine, burner or boiler. Further, the invention relates to a use of an exhaust gas cleaning system for cleaning exhaust gas, e.g. from a marine engine, burner or boiler, on-board a ship.

BACKGROUND ART

Exhaust gas of different kinds is generated in a myriad of different situations, for example in connection with propulsion of vessels. Large ships are typically driven by engines operating on sulphur containing fuel, more particularly high sulphur heavy fuel oil, or low sulphur fuel like VLSFO, ULSFO or diesel. In the combustion of such fuel, exhaust gas containing nitrogen oxides ($NO_X$), and possibly sulphur oxides ($SO_X$) depending on the fuel sulphur level, is formed. The exhaust gas typically also contains particulate matter, such as soot, oil, heavy metals and black carbon (BC) primarily consisting of sub-micron elemental carbon particulates. In order to reduce the impact of the exhaust gas on the environment, the exhaust gas should be cleaned from these pollutants before it is released into the atmosphere. For example, the exhaust gas could be passed through a wet scrubber for removal of sulphur oxides and particulate matter, and/or treated in a SCR reactor for removal of nitrogen oxides.

The scrubber could be a so-called open loop scrubber, which uses the natural alkalinity of seawater to wash out the sulphur oxides from the exhaust gas. Seawater is then fed from the sea, through the scrubber for absorption of $SO_X$ and particulate matter from the exhaust gas, before it is discharged back to the sea.

Alternatively, the scrubber could be a so-called closed loop scrubber, which uses circulating freshwater or seawater, typically in combination with an alkaline agent like sodium hydroxide (NaOH) or sodium carbonate ($Na_2CO_3$), to wash out sulphur oxides and particulate matter from the exhaust gas. In such a scrubber, the amounts of aqueous sulphite, sulphate salts and particulate matter in the circulating freshwater or seawater are gradually increasing. Thus, to control the quality of the circulating freshwater or seawater, a small amount of it may occasionally or continuously be replaced by clean freshwater or seawater and either be stored on the ship or be discharged overboard after cleaning from particulate matter.

The scrubbers used for this purpose today are capable of removing most of the sulphur oxides and some, but less, of the particulate matter from the exhaust gas. $SO_X$ emissions are already regulated by the IMO worldwide and regulation of black carbon and particulate matter in general is expected in the future. In view thereof, there is a need for an exhaust gas cleaning technique enabling removal of more particulate matter from exhaust gas.

SUMMARY

Disclosed here is an improved exhaust gas cleaning system for cleaning exhaust gas, an improved method for cleaning exhaust gas and an improved use of an exhaust gas cleaning system for cleaning exhaust gas on-board a ship.

The basic concept is to provide cleaning of exhaust gas by means of a particle filter device which allows for increased particulate matter removal from the exhaust gas.

An exhaust gas cleaning system disclosed here is for cleaning exhaust gas, e.g. onboard a ship. The exhaust gas cleaning system comprises a particle filter device, which in turn comprises a casing and a plurality of hollow, ceramic filter rods arranged inside an exhaust gas passage of the casing and longitudinally extending essentially vertically and along each other. Vertically is perpendicular to horizontally and parallel to the direction of gravity. The filter rods are partly or completely, in other words at least partly, arranged within the exhaust gas passage. In other words, either a respective portion of the filter rods or the complete filter rods extend inside the exhaust gas passage. The particle filter device further comprises an exhaust gas inlet arranged to allow exhaust gas to flow into the casing upstream the exhaust gas passage, and an exhaust gas outlet arranged to allow exhaust gas to flow out of the casing downstream the exhaust gas passage. The particle filter device is configured to guide exhaust gas from the exhaust gas inlet, through said exhaust gas passage and to the exhaust gas outlet. The particle filter device further comprises a perforated plate arranged downstream the exhaust gas inlet and upstream said exhaust gas passage. The plate extends at least partly along said filter rods and it partly blocks or closes an exhaust gas flow path from the exhaust gas inlet to said exhaust gas passage. The perforated plate defines openings arranged to allow exhaust gas to flow into said exhaust gas passage. The filter rods are gas permeable to allow exhaust gas to penetrate, during filtration, a respective wall of the filter rods and flow into said filter rods. Further, a respective open upper end of the filter rods are in communication with said exhaust gas outlet so as to allow exhaust gas to leave the casing.

The casing may be of any suitable shape and material, such as for example stainless steel and/or carbon steel, and the exhaust gas passage may have any suitable shape, such as the shape of a rectangular parallelepiped.

A plurality or all of the filter rods may be separated from each other and comprised in a filter set up of so-called candle type. As compared to e.g. a filter of so-called wall flow type, a candle type filter is: flexible since its configuration can easily be changed by addition or removal of filter rods, easy to clean since it enables efficient soot blowing, and cheap since the filter rods can easily be mass produced. Separation of the filter rods enables distribution of exhaust gas all the way around the filter rods, and it also enables use of much filter rod surface for exhaust gas filtration. Further, the filter rods may be arranged in a formation which promotes a more even distribution of the exhaust gas around the filter rods and an effective exhaust gas filtration. The filter rods may have any suitable cross section, such as a circular, oval or polygonal, and any wall thickness. For example, the filter rods may have a circular cross section and an outer diameter of 40-200 mm, a length of 0.3-3 m and a wall thickness of 5-30 mm.

In that the filter rods extend vertically and not horizontally, they are less fragile and less prone to being damaged.

The filter rods each have an open upper end. By upper end is meant the end that is furthest from the ground or a floor of a space in which the exhaust gas system is arranged. The filter rods may each have a closed lower end. By lower end is meant the end that is closest to the ground or a floor of a space in which the exhaust gas system is arranged.

It should be stressed that "communicating" and "communication", throughout the text, means "communicating directly or indirectly" and "direct or indirect communication", respectively. Similarly, "receiving", "feeding", "outputting" etc., throughout the text, means "receiving directly or indirectly", "feeding directly or indirectly", and "outputting directly or indirectly", respectively.

Further, it should be stressed that, throughout this text, the term "exhaust gas" is used for untreated exhaust gas as well as exhaust gas cleaned to different degrees.

Herein, by "upstream" is meant "before" as seen in an exhaust gas flow direction, and by "downstream" is meant "after" as seen in an exhaust gas flow direction.

As said above, the perforated plate, which may be of any suitable material, such as stainless steel, partly blocks or closes an exhaust gas flow path from the exhaust gas inlet to the exhaust gas passage. The exhaust gas flow path is only "partly" blocked since the openings of the plate still allows exhaust gas to pass the plate. The openings of the plate may have any suitable design, e.g. be circular, oval or polygonal, or any mix thereof. The open area of the perforated plate may be 25-75%, and preferably 40-60%. Further, the exhaust gas flow path may be only "partly" blocked due to the perforated plate being separated from an inside of the casing such that exhaust gas may flow, not only through, but also around, the perforated plate.

As said above, the filter rods are gas permeable so as to allow exhaust gas to penetrate the filter rod walls and flow into an interior of the filter rods. When the exhaust gas penetrates the filter rod walls, particulate matter such as soot, oil, heavy metals and black carbon is deposited on an outside surface of the filter rods while the rest of the exhaust gas flows into the filter rods. Thereby, the exhaust gas is filtered and cleaned from particulate matter before flowing upwards towards the open upper ends of the filter rods and the exhaust gas outlet.

In that the particle filter device comprises a perforated plate which the exhaust gas needs to pass before reaching the exhaust gas passage containing the filter rods, the exhaust gas may be distributed relatively even around the filter rods which is beneficial from a exhaust gas filtering efficiency point of view. The perforated plate may comprise opposing first and second outer side sections, wherein at least a portion of the first outer side section, e.g. an upper portion, is bent, possibly angled, around a vertical axis in a direction towards the filter rods.

In that at least a portion of the first outer side section is bent in the way specified above, the perforated plate is "folded", and may direct the exhaust gas, towards the filter rods so as to improve the distribution of the exhaust gas around the filter rods.

Naturally, also at least a portion of the second outer side section, e.g. an upper portion, may be bent around a vertical axis in a direction towards the filter rods.

The perforated plate may further comprise an outer lower section, wherein at least a portion of the outer lower section is bent, possibly angled, around a horizontal axis in a direction towards the filter rods.

In that at least a portion of the outer lower section is bent in the way specified above, the perforated plate is "folded", and may direct the exhaust gas, towards the filter rods so as to improve the distribution of the exhaust gas around the filter rods.

The exhaust gas cleaning system may further comprise an elongate plate reinforcement projection extending from the perforated plate towards the filter rods. The plate reinforcement projection need not extend directly or straight, but could also extend obliquely, towards the filter rods. The plate reinforcement projection may be differently positioned on the plate. As an example, the plate reinforcement projection may extend from, and/or along at least a portion of, an outer edge of the perforated plate. Further, the plate reinforcement projection may, or may not, be integrally formed with the perforated plate. As revealed by the name, the plate reinforcement projection may strengthen the perforated plate such that uncontrolled vibrations, deformation and damages to the perforated plate can be avoided. Further, depending on its position on the perforated plate, the plate reinforcement projection may decrease the risk of a "standing vortex" or turbulence being generated by the outer edge of the perforated plate, which "standing vortex" could increase the risk of uncontrolled vibrations in the filter rods arranged closest to the perforated plate, and especially corners thereof.

The filter rods may be divided into a number $n>1$ of groups. Further, a distance between adjacent ones of at least a majority of the filter rods within each of said groups may be $<x$, and a distance between adjacent ones of the filter rods of two adjacent ones of the groups may be $>x$ so as to form $n-1$ intermediate distribution channels. Each of these one or more intermediate distribution channels will extend between two adjacent ones of the groups and may promote a more even distribution of the exhaust gas around the filter rods.

At least one of said intermediate distribution channels may extend in a direction away from the perforated plate. Such a design may promote exhaust gas distribution around the filter rods arranged most distant to the perforated plate.

A set of outer filter rods of the filter rods may be arranged on a distance from the casing so as to form a first outer distribution channel extending between said set of outer filter rods and the casing. This first outer distribution channel may promote a more even distribution of the exhaust gas around the filter rods.

Naturally, another set of outer filter rods of the filter rods may be arranged on a distance from the casing so as to form a second outer distribution channel extending between said another set of outer filter rods and the casing, and possibly parallel to the first outer distribution channel. This second outer distribution channel may even further promote a more even distribution of the exhaust gas around the filter rods.

The first and/or the second outer distribution channel may extend in a direction away from the perforated plate. Such a design may promote exhaust gas distribution around the filter rods arranged most distant to the perforated plate.

Herein, when reference is made to 'distance between filter rods' or 'distance between filter rods and casing', the distance is measured from an outer surface of the filter rods.

The exhaust gas inlet may be arranged at a top portion of the exhaust gas passage, i.e. above the lower ends of the filter rods. More particularly, the exhaust gas inlet may be arranged between or within two imaginary separated horizontal planes which define an extension of an upper half of the perforated plate. Thus, one of the imaginary horizontal planes splits the perforated plate in two at half its vertical extension, while the other one of the imaginary horizontal planes extends flush with an upper edge of the perforated plate. Thereby, an upwards directed exhaust gas flow around the filter rods may be minimized which, in turn, may minimize an upwards flow of particulate matter originating from the exhaust gas. Consequently, collection of the particulate matter may be facilitated.

The particle filter device may further comprise a soot blowing arrangement arranged to blow gas into the open upper ends of the filter rods to loosen particles or particulate matter deposited by the exhaust gas on an outside surface of the filter rods. Thereby, a possibility of cleaning the filter rods so as to maintain their filtering capability is offered.

The soot blowing arrangement may be arranged to blow gas into the open upper ends of a subset of the filter rods at a time to loosen particles or particulate matter deposited by the exhaust gas on an outside surface of said subset of the filter rods. By blowing gas into only a subset, instead of into all, of the filter rods at a time, the exhaust gas cleaning system may still be operated, and may not have to be shut down, during the filter rod cleaning. For example, a subset of filter rods may be the filter rods arranged along one and the same straight line.

The casing may define a dirt collection space for collecting the particles or particulate matter loosened from the outside surface of said subset of the filter rods. The dirt collection space may be arranged underneath said exhaust gas passage. Thereby, gravity may aid in collecting loose particles or particulate matter from the exhaust gas passage in said dirt collection space. Further, the dirt collection space may be tapered in a direction downwards. Thereby, gravity may aid in collecting loose particles or particulate matter in a bottom of the dirt collection space. Furthermore, the particle filter device may comprise a mechanism for opening and closing the bottom of the dirt collection space for discharge of the particulate matter. This mechanism may comprise an automatic or manual gastight outlet valve.

The filter rods may be coated or impregnated with a substance comprising at least a first catalyst. The complete filter rods, or only parts thereof, may be coated or impregnated. The first catalyst could be a reduction catalyst for promoting reduction of nitrogen oxides contained in the exhaust gas, or an oxidation catalyst for promoting oxidation of hydrocarbons contained in the exhaust gas. The substance could also comprise a second catalyst in the form of a reduction catalyst or an oxidation catalyst.

The exhaust gas cleaning system may further comprise a scrubber arranged downstream the particle filter device for cleaning the filtered exhaust gas from sulphur oxides. Additionally/alternatively, the exhaust gas cleaning system may comprise a boiler for exhaust gas heat recovery arranged downstream the particle filter device. By having the boiler arranged after the exhaust gas cleaning system, filtered exhaust gas is fed to through boiler which may result in less fouling of the surfaces of the boiler as compared to if unfiltered exhaust gas instead was fed through the boiler.

The exhaust gas cleaning system may further comprise means for occasionally introducing hot gas, instead of the exhaust gas to be cleaned by the exhaust gas cleaning system, into the exhaust gas passage for regeneration of the filter rods. These means may comprise the exhaust gas inlet, wherein the exhaust gas inlet may be arranged to allow either exhaust gas or the hot gas intended for filter rod regeneration to flow into the casing upstream said exhaust gas passage.

The disclosed method is for cleaning exhaust gas by means of a particle filter device. The particle filter device comprises a casing and a plurality of hollow, ceramic, gas permeable filter rods arranged at least partly inside an exhaust gas passage of the casing and longitudinally extending essentially vertically and along each other. The particle filter device further comprises an exhaust gas inlet arranged to allow exhaust gas to flow into the casing upstream the exhaust gas passage, an exhaust gas outlet arranged to allow exhaust gas to flow out of the casing downstream the exhaust gas passage, and a perforated plate arranged downstream the exhaust gas inlet and upstream said exhaust gas passage, which plate extends at least partly along said filter rods and partly blocks an exhaust gas flow path from the exhaust gas inlet to said exhaust gas passage. The method comprises the steps of feeding exhaust gas into the casing and feeding exhaust gas through openings of the perforated plate into the exhaust gas passage. The method further comprises the steps of filtering exhaust gas by allowing it to penetrate a respective wall of said filter rods and flow into said filter rods, releasing exhaust gas through a respective open upper end of the filter rods, and feeding exhaust gas out of the casing.

The method may comprise the step of guiding exhaust gas inside the casing by means of opposing first and second outer side sections of the perforated plate. At least a portion of the first outer side section may be bent around a vertical axis in a direction towards the filter rods.

The method may comprise the step of guiding exhaust gas inside the casing by means of an outer lower section of the perforated plate. At least a portion of the outer lower section may be bent around a horizontal axis in a direction towards the filter rods.

The method may comprise the step of feeding exhaust gas in n−1 intermediate distribution channels formed inside the exhaust gas passage. The filter rods may be divided into a number n>1 of groups, and a distance between adjacent ones of at least a majority, possibly all, of the filter rods within each of said groups may be <x. Further, a distance between adjacent ones of the filter rods of two adjacent ones of the groups may be >x so as to form said n−1 intermediate distribution channels. Each one of said intermediate distribution channels may extend between two adjacent ones of the groups.

At least one of the intermediate distribution channels may extend in a direction away from the perforated plate.

The method may comprise the step of feeding exhaust gas in a first outer distribution channel formed inside the exhaust gas passage. A set of outer filter rods of the filter rods may be arranged on a distance from the casing so as to form said first outer distribution channel extending between said set of outer filter rods and the casing.

The first outer distribution channel may extend in a direction away from the perforated plate.

The method may comprise the step of feeding exhaust gas into the casing between two separated horizontal planes which define an extension of an upper half of the perforated plate.

The method may comprise the step of blowing gas into the open upper ends of a subset of the filter rods at a time to loosen particles deposited by the exhaust gas on an outside surface of the subset of the filter rods.

The method may comprise the step of collecting the particles loosened from the outside surface of the subset of the filter rods in a dirt collection space arranged underneath the exhaust gas passage.

The method may comprise the step of providing the filter rods with a coating or an impregnation of a substance comprising at least a first catalyst. The first catalyst may be a reduction catalyst for promoting reduction of nitrogen oxides contained in the exhaust gas, or an oxidation catalyst for promoting oxidation of hydrocarbons contained in the exhaust gas.

The method may comprise the step of feeding the filtered exhaust gas through a scrubber for cleaning it from sulphur oxides. Additionally/alternatively, the method may comprise the step of feeding the filtered exhaust gas through a boiler for recovering heat from it.

The method may comprise the step of occasionally introducing hot gas, instead of the exhaust gas to be cleaned by the exhaust gas cleaning system, into the exhaust gas passage for regeneration of the filter rods.

A use of an exhaust gas cleaning system disclosed here is for cleaning exhaust gas onboard a ship.

The above discussed advantages of the different embodiments of the exhaust gas cleaning system are also present for the corresponding different embodiments of the method for cleaning exhaust gas and the use.

Still other features, aspects and advantages will appear from the following detailed description as well as from the drawings.

BRIEF DESCRIPTION OF THE DRAWINGS

The exhaust gas cleaning system, method for cleaning exhaust gas and use of an exhaust gas cleaning system disclosed here will now be described in more detail with reference to the appended schematic drawings, in which FIG. 1 schematically illustrates an exhaust gas cleaning system according to the disclosure and an engine, FIG. 2 schematically illustrates a vertical cross section of a particle filter device of the exhaust gas cleaning system in FIG. 1, FIG. 3 schematically illustrates a horizontal cross section of the particle filter device in FIG. 2 just beneath a hole plate of the particle filter device, FIG. 4a schematically illustrates a side view of a perforated plate of the particle filter device in FIGS. 2 and 3, FIG. 4b schematically illustrates a front view of the perforated plate in FIG. 4a, FIG. 4c schematically illustrates a top view of the perforated plate in FIG. 4a, FIG. 4d schematically illustrates a bottom view of the perforated plate in FIG. 4a, and FIG. 5 illustrates the same as FIG. 3 but for an exhaust gas cleaning system according to an alternative embodiment.

DETAILED DESCRIPTION

Figure 1:
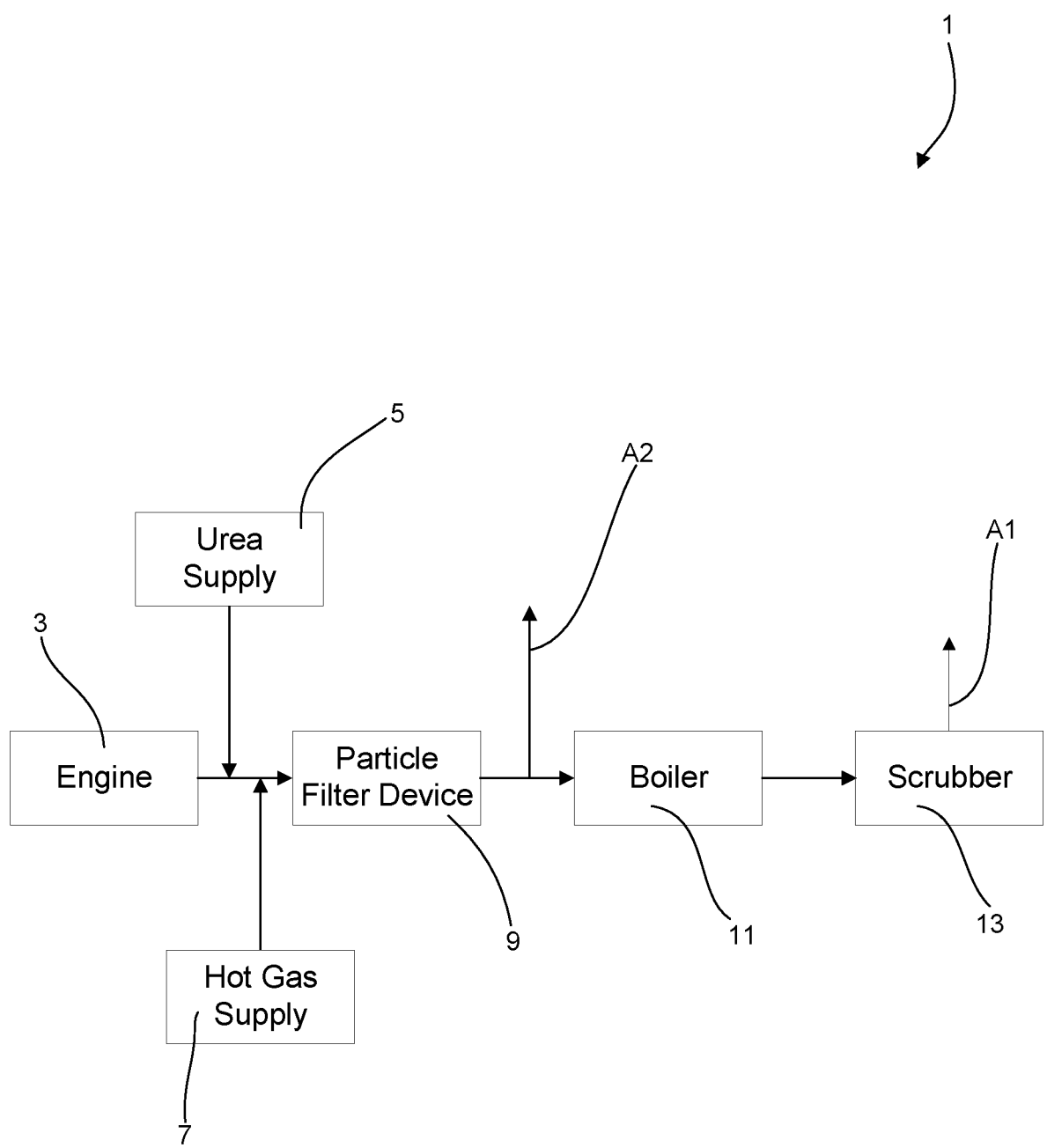

FIG. 1 illustrates an exhaust gas cleaning system 1 used for cleaning exhaust gas from an engine 3 installed onboard a ship (not illustrated) from nitrogen oxides, sulphur oxides, hydrocarbons and particulate matter, such as black carbon. The exhaust gas cleaning system 1 comprises a urea supply 5, a hot gas supply 7, a particle filter device 9, a boiler 11 and a scrubber 13. In a first operation mode of the exhaust gas cleaning system 1, the hot gas supply 7 is inactive while exhaust gas discharged from the engine 3 is fed in turn through the particle filter device 9, the boiler 11 and the scrubber 13 before it is released into the atmosphere as illustrated by arrow A1. Urea from the urea supply 5 is injected into the exhaust gas before it is fed to the particle filter device 9. When injected into the exhaust gas which is hot, the urea quickly decomposes into ammonia. The exhaust gas discharged from the particle filter device 9 is fed through the boiler 11 to recover heat from the exhaust gas. The heat recovered may, for example, be used to heat water and produce steam needed onboard the ship. The design and operation of exhaust gas heat recovery boilers are well-known and will not be described herein. The exhaust gas discharged from the boiler 11 is fed through the scrubber 13 for further removal of particulate matter but especially to clean the exhaust gas from sulphur oxides. The scrubber may be a wet scrubber of open loop type or a closed loop type or a hybrid thereof. The design and operation of exhaust gas scrubbers are well-known and will not be described herein. The exhaust gas fed through the particle filter device 9 is filtered to be cleaned from particulate matter. The rest of this description will be focused on the particle filter device 9 and the method performed by means of it.

Figure 2:
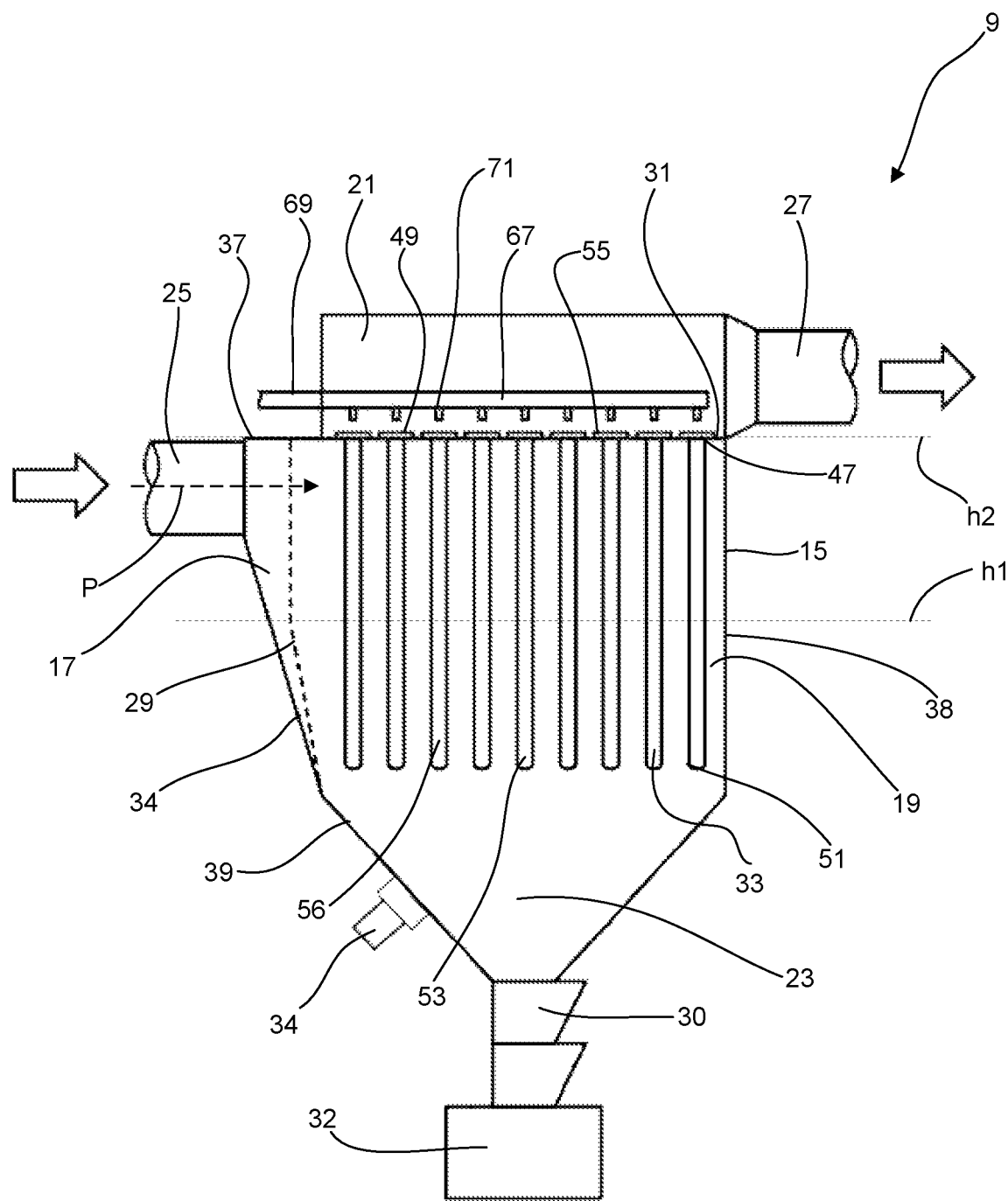
Figure 3:
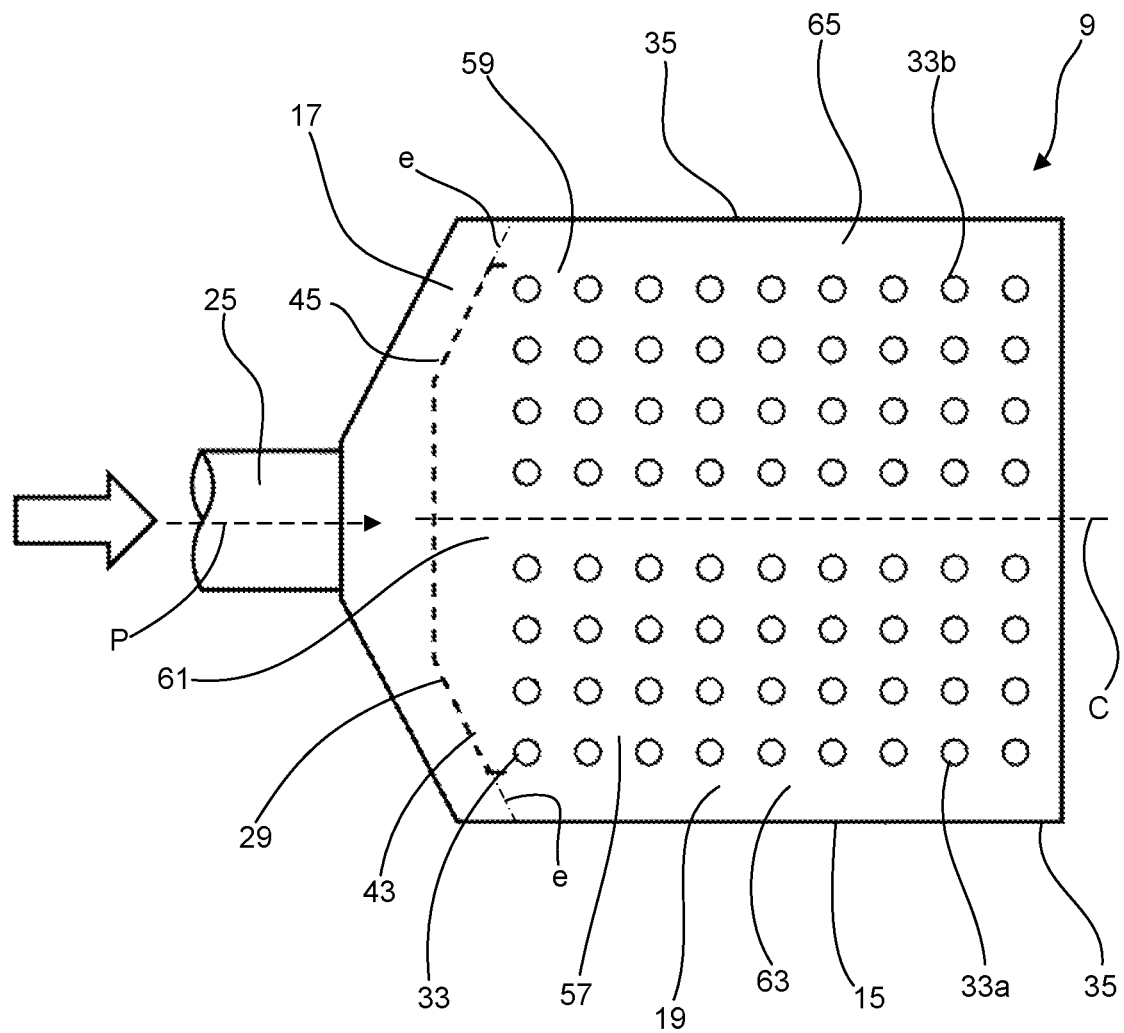

With reference to FIGS. 2 and 3, the particle filter device 9 comprises casing 15 defining an exhaust gas reception space 17, an exhaust gas passage 19, an exhaust gas discharge space 21 and a dirt collection space 23. The part of the casing 15 defining the dirt collection space 23 is made of stainless steel while the rest of the casing 15 is made of carbon steel. The exhaust gas discharge space 21 is arranged above the exhaust gas passage 19, and the dirt collection space 23 is arranged below the exhaust gas passage 19. Further, the particle filter device 9 comprises an exhaust gas inlet 25 communicating with the exhaust gas reception space 17, an exhaust gas outlet 27 communicating with the exhaust gas discharge space 21, a perforated plate 29, a hole plate 31 and a plurality of separated elongate gas permeable hollow ceramic filter rods or pipes 33.

The dirt collection space 23 is funnel shaped and provided with a mechanism 30 for opening and closing its bottom in connection with emptying of the dirt collection space 23. The material, here loosened deposits, emptied from the dirt collection space 23 is stored in a stainless steel container 32 arranged underneath the dirt collection space 23. To facilitate collection of the loosened deposits at the bottom of the dirt collection space 23 and then in the container 32, the particle filter device further comprises a hammer or vibrator 34 arranged on the outside of the dirt collection space 23.

The exhaust gas inlet 25 extends into a short side portion 34 of the casing 15, at the height of a respective upper portion of the filter rods 33, i.e. between two imaginary separated horizontal planes h1 and h2 defining an extension of an upper half 36 (FIG. 4b) of the perforated plate 29.

The exhaust gas outlet 27 extends out of a short side portion 38 of the casing 15, which side portion 38 is opposite to the side portion 34 of the casing 15, above the upper imaginary horizontal plane h2.

The perforated plate 29 and opposing imaginary extensions e of the same, which are illustrated with dash-dot-dot lines in FIG. 3, separate, or define the border between, the exhaust gas reception space 17 and the exhaust gas passage 19. As is clear from FIG. 3, the perforated plate 29 does not transversally extend all the way through, i.e. between two opposing vertical long side portions 35 of, the casing 15 to allow for exhaust gas to flow between the perforated plate 29 and the two long side portions 35 of the casing 15. However, with reference to FIG. 2, the perforated plate 29 longitudinally extends all the way through, i.e. between top and bottom portions 37 and 39, respectively, of, the casing 15 to prevent exhaust gas to flow between the perforated plate 29 and the top and bottom portions 37 and 39 of the casing 15. With reference to FIGS. 4a-4d the perforated plate 29 comprises a plurality of circular openings 41 arranged to allow for exhaust gas to flow through the perforated plate 29 along an exhaust gas flow path P (FIG. 2). The perforated plate 29 is of stainless steel and comprises opposing downwards extending longitudinal first and second outer side sections 43 and 45 and a transverse outer lower section 44. The outer lower section 44 has the shape of a trapezoid and it is folded around a horizontal axis H1 in a direction towards the filter rods 33. A respective rectangular upper portion 43u and 45u of the first and second outer side sections 43 and 45 are folded towards the filter rods 33 and each other around a respective vertical axis V1 and V2, while a respective lower portion 43l and 45l of the first and second outer side sections 43 and 45 are folded towards each other around a respective inclined axis l1 and l2. Thereby, the perforated plate 29 has a trough shape which, as will be further discussed below, will promote a more uniform exhaust gas distribution in the exhaust gas passage 19.

Figures 4A, 4B:
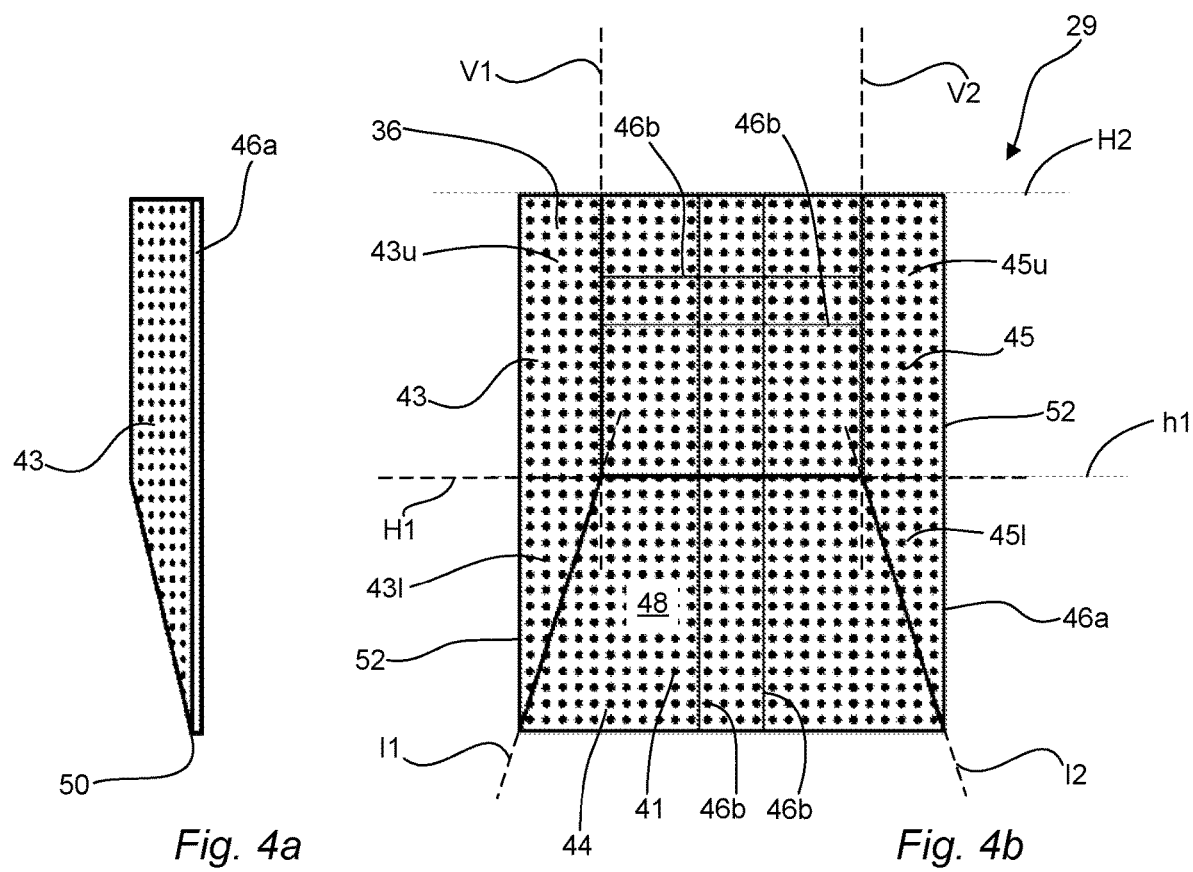
Figure 4C:
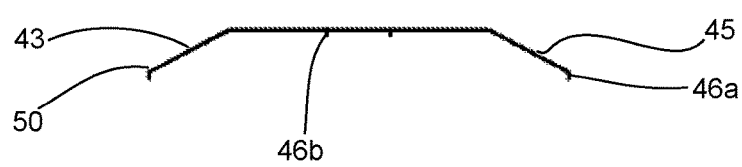
Figure 4D:
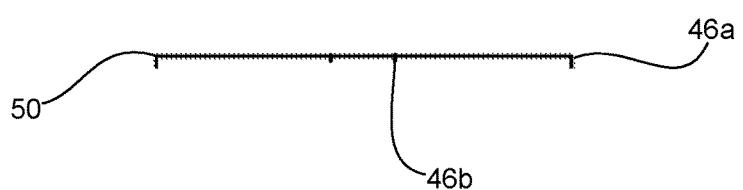

With reference to FIGS. 4a-4c, the perforated plate 29 is provided with two outer plate reinforcement projections 46a and four inner plate reinforcement projections 46b in the form of elongate flanges. The outer and inner plate reinforcement projections 46a and 46b are welded onto a surface 48 of the perforated plate 29 arranged to face the filter rods 33, and they extend essentially horizontally in a direction towards the filter rods 33. The outer plate reinforcement projections 46a extend along a respective long side 52 of the perforated plate 29 and project from an outer edge 50 thereof. The inner plate reinforcement projections 46b form a cross between the outer plate reinforcement projections 46a.

With reference to FIG. 2, the hole plate 31 separates the exhaust gas passage 19 from the exhaust gas discharge space 21. The hole plate 31 defines a plurality of circular holes 47 which are larger than the openings 41 of the perforated plate 29. The filter rods 33 extend vertically and along each other. Each of the filter rods 33 has a circular cross section, an open upper end 49 and a closed lower end 51. At and around the upper end 49 of each of the filter rods 33, a thickness of a filter rod wall 53 is locally increased so as to form a flange 55 with an outer diameter exceeding a diameter of the holes 47. Each of the filter rods 33 extends through a respective one of the holes 47 of the hole plate 31 such that a major part of the filter rod extends within the exhaust gas passage 19 and the flange 45 of the filter rod is arranged within the exhaust gas discharge space 21. Thus, the filter rods 33 discharge into the exhaust gas discharge space 21. The filter rods 33 are impregnated with a substance containing an oxidation catalyst as well as an reduction catalyst. Here, the oxidation catalyst is based on a noble metal such as palladium or platinum but any suitable oxidation catalyst is conceivable. Similarly, here the reduction catalyst is based on vanadium pentoxide in combination with titanium dioxide but any suitable reduction catalyst is conceivable.

With reference to FIG. 3 the filter rods 33 are arranged in a specific pattern. More particularly, they are divided into a first and a second group 57 and 59 of filter rods arranged on opposite sides of a horizontal center axis C of the exhaust gas passage 19. In FIG. 3, a total of eight rows of filter rods 33, four rows on each side of the horizontal center axis C, each row containing nine filter rods 33, are illustrated. However, the number of filter rod rows, and the number of filter rods in each row, can be varied endlessly. The filter rods 33 within one and the same group of the first and second groups 57 and 59 are arranged closer than one of the filter rods 33 within the first group 57 and one of the filter rods 33 within the second group 59. Thereby, an intermediate distribution channel 61 is formed between the first and second groups 57 and 59 of filter rods 33, which intermediate distribution channel 61 extends from a center of the perforated plate 29 in a direction from the perforated plate 29 and the exhaust gas inlet 25. Further, the filter rods 33 within one and the same group of the first and second groups 57 and 59 are arranged closer than outer filter rods 33a of the filter rods 33 within the first group 57, or outer filter rods 33b of the filter rods 33 within the second group 59, and the casing 15. Thereby, a first outer distribution channel 63 is formed between the first group 57 of filter rods 33 and the casing 15, while a second outer distribution channel 65 is formed between the second group 59 of filter rods 33 and the casing 15. The first and second outer distribution channels 63 and 65 extend in a direction from the perforated plate 29 and the exhaust gas inlet 25, more particularly essentially parallel to the intermediate distribution channel 61 and the horizontal center axis C of the exhaust gas passage 19.

A method for cleaning exhaust gas from the engine 3 is performed by means of the exhaust gas cleaning system 1. As said above, with reference to FIG. 1, in a first operation mode of the exhaust gas cleaning system 1, exhaust gas discharged from the engine 3 is fed in turn through the particle filter device 9, the boiler 11 and the scrubber 13 before it is released into the atmosphere. With reference to the particle filter device 9 and FIG. 2, exhaust gas from the engine 3 is fed into the casing 15, more particularly into the exhaust gas reception space 17, via the exhaust gas inlet 25, i.e. at the height of a respective upper portion of the filter rods 33. Then, the exhaust gas is fed past the perforated plate 29 through the openings 41 thereof, and through the passages between the perforated plate 29 and the two long side portions 35 of the casing 15 (FIG. 3), into the exhaust gas passage 19, and especially into the intermediate and the first and second outer distributions channels 61, 63 and 65 defined therein by the filter rods 33. The exhaust gas conveyed through the channels 61, 63 and 65 is eventually forced into the groups 57 and 59 of filter rods 33 because of the lower exhaust gas pressure within the filter rod groups 57 and 59. The presence and design of the perforated plate 29 promote a more even distribution of the exhaust gas inside the exhaust gas passage 19. Particularly, the folded first and second outer side sections 43 and 45, respectively, enables guiding of the exhaust gas towards the filter rods 33.

Inside the exhaust gas passage 19 the exhaust gas spreads around the filter rods 33. The intermediate and first and second outer distribution channels 61, 63 and 65 aid in conveying the exhaust gas away from the perforated plate 29 and towards the filter rods 33 arranged most distant from the exhaust gas inlet 25. Since the exhaust gas inlet 25 is arranged at the same height as a respective upper portion of the filter rods 33, the exhaust gas density inside the exhaust gas passage 19 will be higher closer to the hole plate 31 than more distant therefrom, and an upwards directed exhaust gas flow inside the exhaust gas passage 19 will be minimized.

Inside the exhaust gas passage 19 the exhaust gas is filtered by penetrating the walls 53 of the filter rods 33 whereby filtered exhaust gas is received inside the filter rods 33 and soot and particulate matter is deposited on an outside surface 56 of the filter rods 33. The deposits on the outside surface 56 of the filter rods 33 are gradually increasing and since the exhaust gas density is higher closer to the hole plate 31, so is also the amount of deposits. Thereby, the exhaust gas inside the exhaust gas passage 19 is gradually forced downwards for penetration of the filter rod walls 53. As said above, the filter rods 33 are impregnated with a substance containing an oxidation catalyst as well as an reduction catalyst. Therefore, when the exhaust gas contacts the filter rods 33, the nitrogen oxides contained in the exhaust gas reacts, in the presence of the reduction catalyst, with ammonia, also contained in the exhaust gas and resulting from the previously discussed decomposition of urea, which results in a degradation of the nitrogen oxides into nitrogen and water. Further, the hydrocarbons contained in the exhaust gas are burned in the presence of the oxidation catalyst for reduction of the overall soot mass and regeneration of the filter rods 33.

Filtered exhaust gas cleaned from nitrogen oxides and hydrocarbons is conveyed upwards inside the filter rods 33 and is discharged into the exhaust gas discharge space 21 via the open upper ends 49 of the filter rods 33. Thereafter, it leaves the particle filter device 9 via the exhaust gas outlet 27.

Thus, during operation of the exhaust gas cleaning system 1 in the first operation mode, there is a gradual build-up of soot and particulate matter deposits on the outside surface 56 of the filter rods 33. These deposits may eventually cause malfunctioning of the particle filter device 9 and they should therefore be removed before getting to thick. In view thereof, with reference to FIG. 2, the particle filter device 9 further comprises a soot blowing arrangement 67 arranged inside the exhaust gas discharge space 21, i.e. above the exhaust gas passage 19 and the filter rods 33. The soot blowing arrangement 67 comprises one gas pipe 69 for each one of the eight rows of filter rods 33, which gas pipe 69 extends parallel to the respective row of filter rods 33. Further, each of the gas pipes 69 is provided with one nozzle 71 for each one of the nine filter rods 33 in each row of filter rods 33. More particularly, each of the nozzles 71 is aligned with a respective one of the filter rods 33 and arranged to blow gas, which is fed through the respective gas pipe 69, into the open upper end 39 of the respective filter rod 33. Gas is fed to the gas pipes 69 by means of an arrangement not illustrated in the figures and not further described herein.

The soot blowing arrangement 67 is operated in response to a change in backpressure inside the particle filter device 9. More particularly, the particle filter device 9 comprises a first pressure sensor (not illustrated) arranged inside the exhaust gas passage 19 and a second pressure sensor (not illustrated) arranged inside the exhaust gas discharge space 21. When the difference between the pressures measured by means of the first and second pressure sensors exceeds a predetermined threshold value, this indicates that the soot and particulate matter deposits on the outside surface 56 of the filter rods 33 are starting to get too thick and that the soot blowing arrangement 67 should be operated. Then, short bursts of pressurized gas, e.g. air, is fed through the gas pipes 69, one of the gas pipes 69 at a time. The pressurized gas is ejected from the nozzles 71 into the corresponding filter rods 33 to create a shock wave that causes loosening of the deposits from the outside surface 56 of the filter rods 33. Since the soot blowing operation is made for one row of, i.e. only a subset of the, filter rods 33 at a time, it does not require a shut-down of the particle filter device 9 which may be operated normally in the meantime. The loosened deposits fall downwards by gravity, which is possible due to the minimization of the upwards directed exhaust gas flow inside the exhaust gas passage 19. Eventually, the loosened deposits end up in the dirt collection space 23. Since the part of the casing 15 defining the dirt collection space 23 is made of stainless steel which has relatively good "sliding" properties, and collection of the deposits at the bottom of the dirt collection space 23 is facilitated. Also, the provision of the hammer or vibrator 34 on the outside of the dirt collection space 23 helps to collect the deposits at the dirt collection space bottom. When the dirt collection space 23 needs to be emptied, the mechanism 30 is operated and the deposits are discharged to the container 32.

Thus, in the first operation mode of the exhaust gas cleaning system 1, exhaust gas from the engine 3 is fed through the particle filter device 9, the boiler 11 and the scrubber 13 for removal of soot and particular matter, together with nitrogen oxides and hydrocarbons, and eventually also sulphur oxides, from the exhaust gas. As discussed above, during operation of the exhaust gas system 1 in the first operation mode, soot and particulate matter from the exhaust gas adhere to the outside surface 56 of the filter rods 33. When the backpressure in the particle filter device 9 becomes too high, the soot blowing arrangement 67 is operated and gas is injected into the filter rods 33, one filter rod row after the other. Thereby, soot and particulate matter are peeled off from the filter rods 33. However, additional deeper cleaning of the particle filter device 9 may be necessary once in a while, to assure proper operation of the exhaust gas system 1.

In view of the above, the exhaust gas system 1 is also arranged for operation in a second operation mode. In the second operation mode, with reference to FIG. 1, the exhaust gas flow from the engine 3 to the particle filter device 9 is shut off, just like the urea flow from the urea supply 5. Instead, the hot gas supply 7 is activated and blows hot gas through the particle filter device 9. The hot gas supply 7 may comprise an electrical heater for heating gas. The hot gas may originate from a burner or the engine itself, possibly from before a turbocharger. The hot gas follows the same, above specified, way as the exhaust gas through the particle filter device 9. After discharge from the particle filter device 9, the hot gas is discharged from the exhaust gas system 1 as illustrated by arrow A2, or it is fed through the boiler 11 and possibly also the scrubber 13. Inside the exhaust gas passage 19 the hot gas boosts the regeneration of the filter rods 33 by intensifying the burning of hydrocarbons remains on and in the wall 53 of the filter rods 33. After the intensified thermal regeneration, the exhaust gas system 1 is again ready for the first operation mode. Switching between the first and second operation modes can be done automatically or manually.

Figure 5:
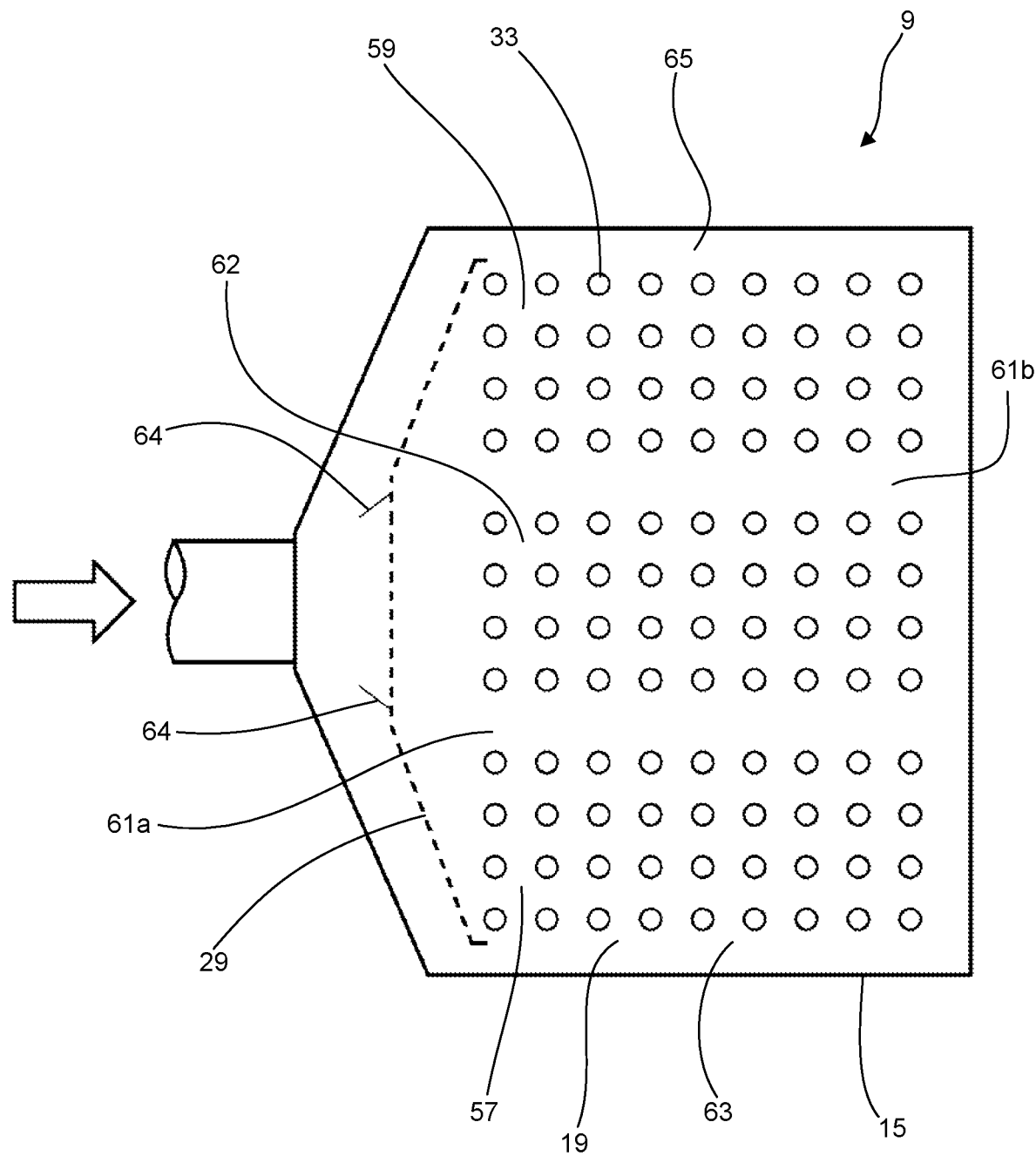

FIG. 5 illustrates a particle filter device 9 of an exhaust gas cleaning system according to another embodiment. This particle filter device 9 is very similar to the particle filter device 9 described above with reference to FIGS. 1 and 4a-4c, and hereinafter, primarily the differing features will be discussed.

The filter rods 33 are arranged in a specific pattern. More particularly, they are divided into first, second and third groups 57, 59 and 62 of filter rods. The third group 62 is centrally arranged inside the exhaust gas passage 19, while the first and second groups 57 and 59 are arranged on opposite sides of the third group 62. In FIG. 5, a total of twelve rows of filter rods 33, four rows in each of the groups, each row containing nine filter rods 33, are illustrated. The filter rods 33 within one and the same group of the first, second and third groups 57, 59 and 62 are arranged closer than two filter rods 33 within different ones of the groups. Thereby, an intermediate distribution channel 61a is formed between the first and third groups 57 and 62 of filter rods 33, and an intermediate distribution channel 61b is formed between the second and third groups 59 and 62 of filter rods 33, which intermediate distribution channels 61a and 61b extend in a direction from the perforated plate 29. Like in particle filter device 9 illustrated in FIG. 3, the filter rods 33 and the casing 15 of the particle filter device 9 illustrated in FIG. 5 define first and second outer distribution channels 63 and 65.

In line with the above discussions with reference to FIG. 3, the intermediate and first and second outer distribution channels 61a, 61b, 63 and 65 are arranged to convey the exhaust gas before it is force into the groups 57, 59 and 62 of filter rods 33 to promote a more uniform exhaust gas distribution inside the exhaust gas passage 19. To guide the exhaust gas into all of the intermediate and first and second outer distribution channels 61a, 61b, 63 and 65, the perforated plate 29 comprises a number of guide vanes 64 in the form of elongate plates or flanges welded onto the perforated plate 29. The guide vanes 64 are angled in relation to a normal direction of the perforated plate 29 so as to guide exhaust gas especially into the intermediate distribution channels 61*a* and 61*b*. The guide vanes 64 may extend along the complete, or only part of the, longitudinal extension of the perforated plate 29 and their design, number and position may vary depending on the prevailing circumstances, such as the size of the perforated plate 29 and the number of intermediate distribution channels. The guide vanes 64 could be arranged on a side of the perforated plate 29 facing away from the filter rods 33, as is illustrated in FIG. 5, and/or on a side of the perforated plate 29 facing the filter rods 33. As already said, the main purpose of the guide vanes 64 is to promote a more even distribution of the exhaust gas around the filter rods 33 to improve a performance and functionality of the exhaust gas filter device 9. Another purpose of the guide vanes 64 is to increase the stiffness of the perforated plate.

The above described embodiments should only be seen as examples. A person skilled in the art realizes that the embodiments discussed can be varied in a number of ways without deviating from the inventive conception.

As an example, the soot blowing arrangement need not be arranged to blow gas into only one row of filter rods at a time. According to an alternative embodiment, the soot blowing arrangement is instead arranged to blow gas into all filter rods at the same time. Such an embodiment may require cessation of the exhaust gas feed through the particle filter device, which in turn could require a valve at the exhaust gas inlet and/or at the exhaust gas outlet of the particle filter device. Further, in such an embodiment it may be suitable to have multiple particle filter devices of which one is always available for exhaust gas cleaning.

As another example, which is particularly relevant for filter rods with larger diameters, such as diameters of 100 mm and more, the open upper ends of the filter rods may be provided with venturi inlets. The venturi may draw extra gas into the filter rods during soot blowing and thereby create a more powerful shock wave inside the filter rods. At the same time a possibility to use less pressurized gas is offered.

As yet another example, the soot blowing arrangement need not comprise one gas pipe and one set of nozzles for each row of filter rods. In such an embodiment one or more gas pipes, with associated nozzles, could be movable and able to blow gas into the filter rods of more than one of the rows of filter rods.

Further, the soot blowing arrangement need not comprise any nozzles. Instead, the gas could be ejected directly from holes in the pipe/pipes.

Moreover, in the above described embodiment, the soot blowing arrangement is operated when the difference between the pressures measured by means of the first and second pressure sensors exceeds a predetermined threshold value. In an alternative embodiment, the soot blowing arrangement could instead be operated with predetermined time intervals. In yet another alternative embodiment, the soot blowing arrangement could be operated with predetermined time intervals unless said predetermined threshold value is exceeded, which would shorten the time between two successive operations.

Naturally, the boiler and/or the scrubber may be left out in an exhaust gas cleaning system according to the disclosure. As an example, if the engine is fueled by a low sulphur fuel, then it may be possible to omit the scrubber.

The exhaust gas system could comprise a heating device, such as an electrical heater, for heating the exhaust gas before it is fed to the particle filter device to increase the conversion of nitrogen oxides into nitrogen and water and/or the oxidation of hydrocarbons, inside the exhaust gas passage of the particle filter device. This heating device could be used also for producing hot gas for the hot gas supply which is active in the second operation mode of the exhaust gas cleaning system.

The exhaust gas system could comprise a draft fan for overcoming the backpressure caused by the particle filter device and drawing the exhaust gas through the particle filter device, which fan could be arranged either before or after the particle filter device.

As a final example, ammonia instead of urea could be injected into the exhaust gas before it is fed to the particle filter device.

It should be stressed that the attributes first, second, third, etc. is used herein just for distinguishing purposes and not to express any kind of specific order.

It should be stressed that a description of details not relevant to the description here has been omitted and that the figures are just schematic, simplified and not drawn according to scale. Thus, all components necessary to realize the exhaust gas cleaning system, exhaust gas cleaning method and exhaust gas cleaning system use described here, such as pipes, valves, sensors, pumps, etc., have not been illustrated in the figures or described in the text.

The invention claimed is:

1. An exhaust gas cleaning system for cleaning exhaust gas, which exhaust gas cleaning system comprises:
   a particle filter device, the particle filter device comprising:
      a casing having an inner surface,
      a plurality of hollow ceramic filter rods arranged at least partly inside an exhaust gas passage of the casing and longitudinally extending essentially vertically and along each other,
      an exhaust gas inlet arranged to allow exhaust gas to flow into the casing upstream of said exhaust gas passage, the exhaust gas inlet intersecting the inner surface of the casing at an intersection,
      an exhaust gas outlet arranged to allow exhaust gas to flow out of the casing downstream of said exhaust gas passage,
      the particle filter device being configured to guide exhaust gas from the exhaust gas inlet, through said exhaust gas passage and to the exhaust gas outlet, the particle filter device further comprising
      a perforated plate arranged downstream of the exhaust gas inlet and upstream of said exhaust gas passage, which perforated plate extends at least partly essentially vertically along said filter rods and partly blocks an exhaust gas flow path from the exhaust gas inlet to said exhaust gas passage, the perforated plate having an upper half and a lower half,
      the perforated plate defining openings arranged to allow exhaust gas to flow into said exhaust gas passage and to contact an outer surface of a respective wall of said filter rods, said filter rods being gas permeable to allow exhaust gas to penetrate, during filtration, the respective wall of said filter rods and flow into said filter rods, and a respective open upper end of the filter rods being in communication with said exhaust gas outlet so as to allow exhaust gas to leave the casing, and
      an entirety of the intersection between the exhaust gas inlet and the inner surface of the casing being located between two imaginary separated horizontal planes defining upper and lower boundaries of the upper half of the perforated plate.

2. The exhaust gas cleaning system according to claim 1, wherein the perforated plate comprises opposing first and second outer side sections, at least a portion of the first outer side section being bent around a vertical axis in a direction towards the filter rods.

3. The exhaust gas cleaning system according to claim 1, wherein the perforated plate comprises an outer lower section, at least a portion of the outer lower section being bent around a horizontal axis in a direction towards the filter rods.

4. The exhaust gas cleaning system according to claim 1, further comprising an elongate plate reinforcement projection extending from the perforated plate towards the filter rods.

5. The exhaust gas cleaning system according to claim 1, wherein the filter rods are divided into a number n>1 of groups, and wherein a distance between adjacent ones of at least a majority of the filter rods within each of said groups is <x, and a distance between adjacent ones of the filter rods of two adjacent ones of the groups is >x so as to form n−1 intermediate distribution channels, each one of said intermediate distribution channels extending between two adjacent ones of the groups.

6. The exhaust gas cleaning system according to claim 5, wherein at least one of said intermediate distribution channels extends in a direction away from the perforated plate.

7. The exhaust gas cleaning system according to claim 1, wherein the particle filter device comprises a soot blowing arrangement arranged to blow gas into the open upper ends of a subset of the filter rods at a time to loosen particles deposited by the exhaust gas on an outside surface of said subset of the filter rods.

8. The exhaust gas cleaning system according to claim 1, wherein the filter rods are impregnated with a substance comprising at least a first catalyst.

9. The exhaust gas cleaning system according to claim 1, wherein the exhaust gas cleaning system is positioned onboard a ship.

10. A method for cleaning exhaust gas by a particle filter device, the particle filter device comprising
a casing having an inner surface,
a plurality of hollow, ceramic, gas permeable filter rods arranged at least partly inside an exhaust gas passage of the casing, the filter rods having a lengthwise extent and longitudinally extending essentially vertically and along each other,
an exhaust gas inlet arranged to allow exhaust gas to flow into the casing upstream of said exhaust gas passage, the exhaust gas inlet intersecting the inner surface of the casing at an intersection,
an exhaust gas outlet arranged to allow exhaust gas to flow out of the casing downstream of said exhaust gas passage, and
a perforated plate arranged downstream of the exhaust gas inlet and upstream of said exhaust gas passage, which perforated plate extends at least partly along the lengthwise extent of said filter rods and partly blocks an exhaust gas flow path from the exhaust gas inlet to said exhaust gas passage, the perforated plate having an upper half and a lower half, the upper half of the perforated plate being located between two imaginary separated horizontal planes defining upper and lower boundaries of the upper half of the perforated plate,
which method comprises
feeding exhaust gas into the casing so that all of the exhaust gas entering the casing from the exhaust gas inlet enters the casing at a location between the two imaginary separated horizontal planes defining the upper and lower boundaries of the upper half of the perforated plate,
feeding exhaust gas through openings of the perforated plate into said exhaust gas passage, with the exhaust gas that has been fed through the openings of the perforated plate contacting an outer surface of a respective wall of said filter rods,
filtering exhaust gas by allowing it to penetrate the respective wall of said filter rods and flow into said filter rods,
releasing exhaust gas through a respective open upper end of the filter rods, and
feeding exhaust gas out of the casing.

11. The method according to claim 10, comprising guiding exhaust gas inside the casing by way of opposing first and second outer side sections of the perforated plate, at least a portion of the first outer side section being bent around a vertical axis in a direction towards the filter rods.

12. The method according to claim 10, comprising guiding exhaust gas inside the casing by way of an outer lower section of the perforated plate, at least a portion of the outer lower section being bent around a horizontal axis in a direction towards the filter rods.

13. The method according to claim 10, comprising feeding exhaust gas in n−1 intermediate distribution channels formed inside the exhaust gas passage, wherein the filter rods are divided into a number n>1 of groups, and wherein a distance between adjacent ones of at least a majority of the filter rods within each of said groups is <x, and a distance between adjacent ones of the filter rods of two adjacent ones of the groups is >x so as to form said n−1 intermediate distribution channels, each one of said intermediate distribution channels extending between two adjacent ones of the groups.

14. The method according to claim 10, comprising blowing gas into the open upper ends of a subset of the filter rods at a time to loosen particles deposited by the exhaust gas on an outside surface of said subset of the filter rods.

15. The method according to claim 10, comprising providing the filter rods with an impregnation of a substance comprising at least a first catalyst.

16. The method according to claim 10, wherein the feeding of exhaust gas into the casing comprises feeding into the casing exhaust gas from onboard a ship.

17. An exhaust gas cleaning system for cleaning exhaust gas, which exhaust gas cleaning system comprises:
a particle filter device, the particle filter device comprising:
a casing,
a plurality of hollow ceramic filter rods arranged at least partly inside an exhaust gas passage of the casing and longitudinally extending essentially vertically and along each other,
an exhaust gas inlet arranged to allow exhaust gas to flow into the casing upstream of said exhaust gas passage,
an exhaust gas outlet arranged to allow exhaust gas to flow out of the casing downstream of said exhaust gas passage,
the particle filter device being configured to guide exhaust gas from the exhaust gas inlet, through said exhaust gas passage and to the exhaust gas outlet, the particle filter device further comprising a perforated plate arranged downstream of the exhaust gas inlet and upstream of said exhaust gas passage, which perforated plate extends at least partly along said filter rods and partly blocks an exhaust gas flow path from the exhaust gas inlet to said exhaust gas passage, the perforated plate having a vertically uppermost portion positioned in the casing, a vertically lowermost portion positioned in the casing and a vertically middle portion between the vertically uppermost portion and the vertically lowermost portion, the perforated plate being positioned relative to the exhaust gas inlet such that a straight line passing through a center of the exhaust gas inlet intersects the vertically uppermost portion of the perforated plate, the perforated plate defining openings arranged to allow exhaust gas to flow into said exhaust gas passage, said filter rods being gas permeable to allow exhaust gas to penetrate, during filtration, a respective wall of said filter rods and flow into said filter rods, and a respective open upper end of the filter rods being in communication with said exhaust gas outlet so as to allow exhaust gas to leave the casing.

18. The exhaust gas cleaning system according to claim 17, wherein the perforated plate comprises opposing first and second outer side sections, at least a portion of the first outer side section being bent around a vertical axis in a direction towards the filter rods as viewed from the open upper ends of the filter rods.

19. The exhaust gas cleaning system according to claim 17, wherein the perforated plate comprises opposing first and second outer side sections each bent around a vertical axis in a direction towards the filter rods, the first and second outer side sections each extending from the vertically uppermost portion of the perforated plate toward the vertically lowermost portion of the perforated plate.

20. The exhaust gas cleaning system according to claim 17, wherein the exhaust gas cleaning system is positioned onboard a ship.

\* \* \* \* \*